April 24, 1934. G. JOHNSON 1,956,031
SLIDE FASTENER FOR STRAPS AND THE LIKE
Filed Aug. 18, 1932
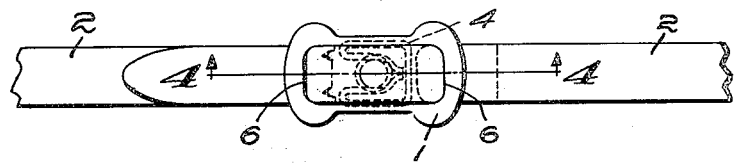
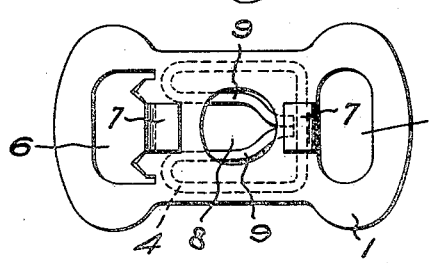 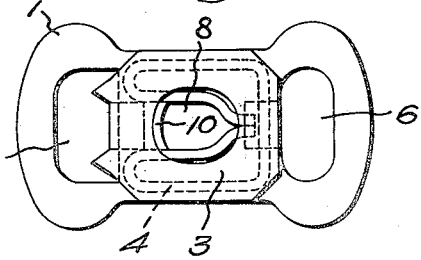
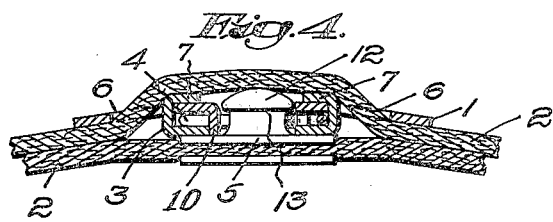 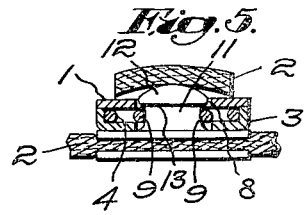
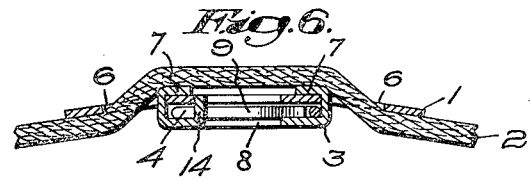
Inventor:
Gustav Johnson, Patented Apr. 24, 1934

1,956,031

UNITED STATES PATENT OFFICE 1,956,031

SLIDE FASTENER FOR STRAPS AND THE LIKE

Gustav Johnson, West Roxbury, Mass., assignor to United-Carr Fastener Corporation, Cambridge, Mass., a corporation of Massachusetts Application August 18, 1932, Serial No. 629,326

5 Claims. (Cl. 24—77)

My invention aims to provide improvements in slide fasteners for straps and the like.

In the drawing, which illustrates preferred embodiments of my invention:—

Figure 1 is a plan view of a fastener installation showing a use of my improved fastener;

Fig. 2 is an enlarged plan view of the socket before attachment to a strap;

Fig. 3 is an underside view of the socket shown in Fig. 2;

Fig. 4 is an enlarged section taken on the line 4—4 of Fig. 1;

Fig. 5 is an enlarged section taken on the line 5—5 of Fig. 1; and

Fig. 6 is a section similar to that shown in Fig. 4, but with the stud engaging lip formed from the spring-retaining part instead of from the plate part as shown in Fig. 4.

Referring now to the particular embodiment of my invention as illustrated in Figs. 1 through 5, I have shown a slide fastener structure which includes a socket having a plate part 1 attached to one end of a strap 2 and carrying a spring-retaining part 3 with a spring 4 held between the parts 1 and 3, as best shown in Fig. 4. A stud 5 is secured to the other end of the strap, or to any other suitable support according to the structure of the device with which the fastening means is to be used.

The specific socket structure shown in Figs. 1 through 5 includes a one-piece plate part 1 having strap-receiving slots 6 at opposite ends, the cup-shaped spring-retaining part 3 and the spring 4. The parts 1 and 3 are secured together by means of attaching portions 7—7 preferably extending from the part 3 through the corresponding slots 6 in the part 1 (Figs. 2 and 4) and are bent over against the part 1. A stud-receiving aperture 8 is formed in each of the parts 1 and 3 in alignment to permit ready engagement and disengagement of the stud 5 with the spring 4.

It is a purpose of my invention to provide a strong, durable fastening means for straps which when engaged cannot be separated by a pull or stresses exerted at at least one predetermined side thereof. Preferably the fastener is so constructed that it is locked against separation except by a pull exerted on the free end of that portion of the strap which carries the socket 1.

The locking is effected by the use of a spring 4 which, by its rectangular shape (Figs. 2 and 3) corresponding to the shape of the part 3, is held against rotation between the parts 1 and 3 and has two yieldable jaws 9—9. These jaws 9—9 intersect apertures 8 in the parts 1 and 3 at three sides thereof (Fig. 4) and have their free ends curved and brought together to provide a three side intersection.

A lip 10 is formed from the material pressed out to form the aperture 8 in the part 1 (Fig. 6) and is located at that side of the aperture not intersected by the jaws 9—9. This lip 10 extends between the jaws and provides a smooth surface against which the stud is pulled, when the stud and socket are under lateral stresses, to prevent wear on the stud and for engagement by the head of the stud for the purposes to be later described.

The stud 5 has a neck 11 (Figs. 2 and 3) beneath a head 12 and a relatively abrupt shoulder 13 between the neck and the head to engage the jaws 9—9 and prevent disengagement of the stud and socket by axial stresses. Furthermore, the co-operative engagement of this shoulder 13 with the jaws 9—9 is such that a separating pull exerted adjacent to that side where the free ends of the jaws are located merely locks the fastener members together because of the substantial bearing engagement of the jaws 9—9 with the shoulder 13.

In Fig. 6, I have shown the same socket as shown in Figs. 1 through 5, with the exception that the lip 14 is formed from the material pressed out to form the aperture in the part 3. The construction of the socket otherwise is the same as that previously described.

When the stud and socket are engaged, they are locked against separation against any stresses and strains which they will normally receive in use. Separation cannot be effected by a pull of one relative to the other at the right hand side of Figs. 1 and 4. However, they may be readily separated by an upward pull on the free end of the strap. During the separating action, the socket tips relative to the stud and the lip 10 engages the head of the stud and prevents the shoulder 13 from catching on the socket adjacent to the aperture 8. Thus the lip 10 guides the head out of engagement from the jaws 9—9 at that side where the jaws are spaced farthest from each other.

My improved socket is particularly desirable for strap attachment because it is simple in construction, positive in operation and has a minimum number of parts for a socket with a wire spring.

While I have illustrated and described preferred embodiments of my invention, I do not wish to be limited thereto because the scope of my invention is best described by the following claims.

I claim:—

1. A slide fastener comprising, in combination, a stud member having a head, a neck and an abrupt shoulder between the head and the neck, a cooperating socket having a plate part provided with strap-receiving slots at opposite ends through which a strap is slidably attached and a spring-retaining part secured to said plate part, attaching portions extending from said retaining part through the strap-receiving slots and clenched into engagement with said plate part to secure the parts together, a spring located between said parts and having two jaws intersecting a stud-receiving aperture through one of said parts, said jaws being shaped to intersect three sides of the aperture and to make locking engagement with the abrupt shoulder of the stud to prevent separation of the stud and socket when the strap is pulled adjacent to one of said slots while being adapted to be released from the stud when the strap is pulled in a predetermined direction adjacent to the other slot when the spring is free from intersecting the said aperture, and a lip extending from one of said parts and being located between them adjacent to that side of the aperture last mentioned to provide a stud-engaging surface.

2. A slide fastener member comprising, in combination, a plate part having spaced strap-receiving slots at opposite ends thereof, a part attached to said plate part at one side thereof between said slots, attaching portions extending from said part through said slots and bent against the opposite side of said plate part to secure said parts together and one element of a snap fastener formed as a part of the fastener member for snap fastening engagement with a cooperating fastener member.

3. A slide fastener member comprising, in combination, a plate part having spaced strap-receiving slots at opposite ends thereof, a part attached to said plate part at one side thereof between said slots, attaching portions extending from said part through said slots and bent against the opposite side of said plate part to secure said parts together, a spring located between said parts and constructed and arranged to engage with a cooperating fastener element while being adapted to lock the cooperating fastener element with the slide fastener member except in one predetermined direction.

4. A slide fastener member comprising, in combination, a plate part having spaced strap-receiving slots at opposite ends thereof, a part attached to said plate part at one side thereof between said slots, attaching portions extending from said part through said slots and bent against the opposite side of said plate part to secure said parts together, a spring located between said parts having jaws intersecting three sides of a stud-receiving aperture through one of said parts and to make locking engagement with a stud fastener member to prevent separation of the cooperating fastener members except in one predetermined direction.

5. A slide fastener member comprising, in combination, a top part having spaced strap-receiving slots at opposite ends thereof, a bottom part attached to said top part at one side thereof between said slots, attaching portions extending from one part through said slots and bent against the opposite side of the other part to secure said parts together and one element of a snap fastener formed as a part of the fastener member for snap fastening engagement with a cooperating fastener member.

GUSTAV JOHNSON.